United States Patent [19]

Turnock et al.

[11] 3,725,299
[45] Apr. 3, 1973

[54] REGENERATION OF MOLECULAR SIEVES HAVING SULFUR COMPOUNDS ADSORBED THEREON

[75] Inventors: Philip H. Turnock, Katonah; William G. Bancroft; Max Lee, both of Yorktown Heights, all of N.Y.

[73] Assignee: Union Carbide Corporation, New York, N.Y.

[22] Filed: Aug. 6, 1970

[21] Appl. No.: 61,679

[52] U.S. Cl. ..................252/411 S, 55/73, 55/75, 62/18, 208/245, 208/305, 208/307
[51] Int. Cl. ..................B01j 11/70, B01d 41/02
[58] Field of Search ..........252/411, 414; 55/73, 75; 208/245, 250, 305, 307; 62/18

[56] References Cited

UNITED STATES PATENTS

| 3,085,380 | 4/1963 | Dillman et al. | 55/62 |
| 3,566,611 | 3/1971 | Sterret | 55/73 |
| 3,470,677 | 10/1969 | Eck et al. | 55/73 |
| 3,211,644 | 10/1965 | Clark | 208/307 |
| 3,010,894 | 11/1961 | Clauson | 208/310 |
| 3,051,646 | 8/1962 | Brooke | 208/245 |
| 3,188,293 | 6/1965 | Bacon et al. | 252/411 R |
| 3,306,945 | 2/1967 | Conuiser | 208/310 |

Primary Examiner—Daniel E. Wyman
Assistant Examiner—P. E. Konopka
Attorney—Paul A. Rose, Robert C. Cummings and Richard G. Miller

[57] ABSTRACT

The sweetening of natural gasoline liquid fractions employing molecular sieve type adsorbents to selectively adsorb the sulfur compound impurities is accomplished using a minimum of non-sorbable purge gas for regeneration purposes. The process comprises using a low boiling condensable paraffin to purge the sulfur compounds from the principal adsorption bed, condensing said paraffin, purifying same in the liquid phase by passage through a large pore molecular sieve bed, and thereafter removing the sulfur compounds from the latter bed with a non-sorbable purge gas.

3 Claims, 1 Drawing Figure

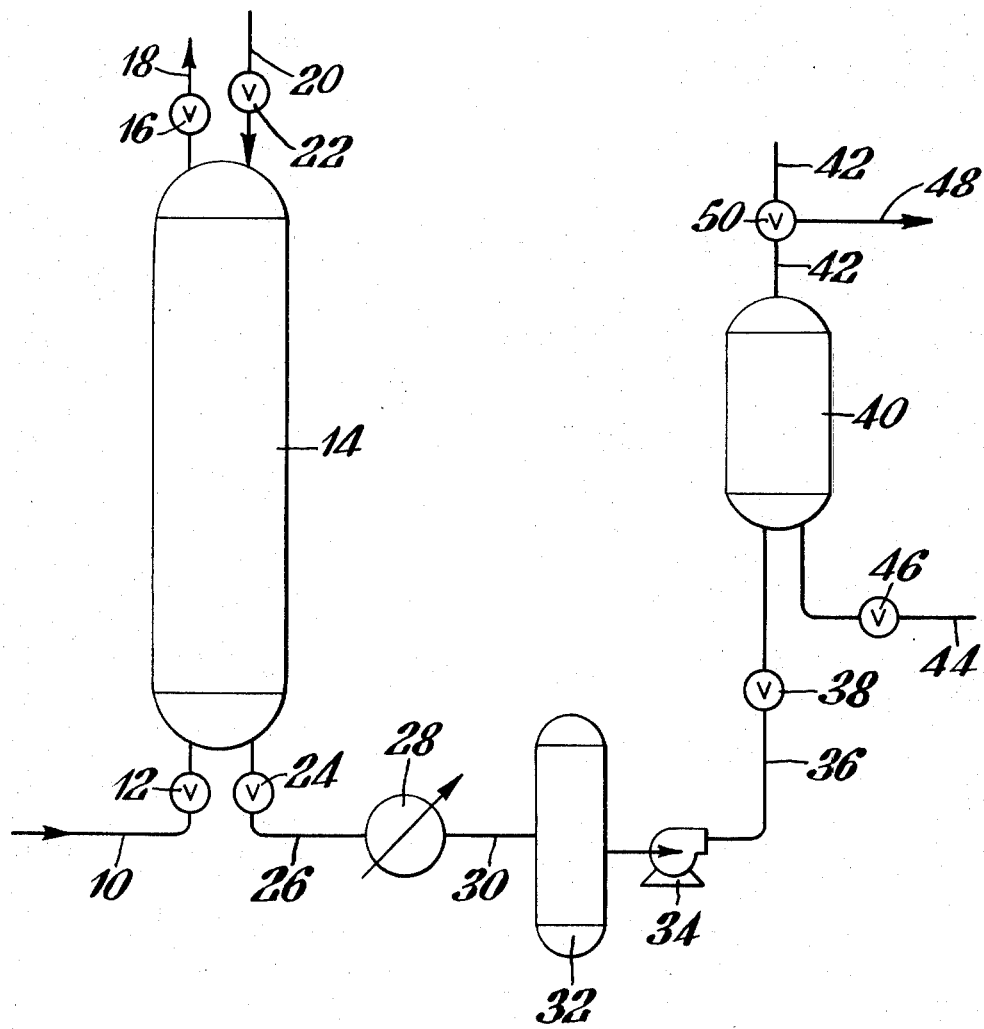

REGENERATION OF MOLECULAR SIEVES HAVING SULFUR COMPOUNDS ADSORBED THEREON

This invention relates in general to purification of hydrocarbons by removal of sulfur compounds from admixture therewith and more particularly to a novel process for sweetening natural gas condensates by the selective adsorption of sulfur compound impurities on a first bed of zeolitic molecular sieve, subsequent removal from the first bed followed by concentration and isolation of the sulfur compound impurities on a second molecular sieve adsorbent bed.

Natural gas condensates, particularly petroleum hydrocarbon fractions boiling in the gasoline range have wide utility both as blending stock for internal combustion engine fuel and as a feed stock for a variety of hydroforming processes such as isomerization. They are also useful as heating fuel and commercial solvents. Sulfur impurities are normally present in such hydrocarbon mixtures and hence their removal to certain specifications is required for all such uses because of its adverse effect on the effectiveness of hydroforming catalysts. Also, sulfur compounds impart unpleasant odor and sometimes are health hazards in the products. The corrosiveness and toxicity of hydrogen sulfide is well known. Moreover, when present in fuels, the sulfur compounds or reaction products thereof are introduced into the atmosphere where they contribute to a serious pollution problem.

It is known to remove sulfur compound impurities from hydrocarbon streams by contact with a molecular sieve in a fixed bed adsorption system and to regenerate the molecular sieve by purging with a heated gas to desorb the sulfur compound. The feasibility of this process is in many instances limited by the quantity of gas available at the plant site for use as the hot gas purge. In some plants there is sufficient need for heating fuel so that the purge gas can be disposed of by combustion for its calorific value. When not used for fuel or when more purge quantity is needed than the plant can use as fuel, it can be flared. Such flaring is, however, an undesired shrinkage of a natural resource. Thus, there is need for new methods for regenerating molecular sieves which will reduce the volumetric purge gas requirement. The novel process of this invention can reduce the amount of purge gas to one-half or less.

In accordance with the present invention sulfur compound impurities can be removed from a molecular sieve bed by the process which comprises providing a primary bed of molecular sieve adsorbent containing as an adsorbate thereon less than about 5 wt. percent based on the weight of anhydrous adsorbent and calculated as elemental sulfur of at least one or a mixture of two or more sulfur compounds of the group consisting of $H_2S$, COS, RSH, RSR and RSSR wherein R is an alkyl group having from one to five carbon atoms, desorbing and purging said adsorbate from the primary bed to the desired degree using in the vapor phase a low boiling readily condensible paraffin desorbent at a temperature in the range of from about 400° F. to 650° F., isobarically condensing the desorbent containing the sulfur compound desorbate to form a solution containing at least 50 wt. percent of the total sulfur compound desorbate and at least 30 wt. percent of the total desorbent used to purge the sulfur compounds from the primary bed, thereafter passing said solution in the liquid phase through a smaller secondary molecular sieve adsorption bed wherein the sulfur compounds are selectively adsorbed on the molecular sieve adsorbent, and thereafter desorbing the sulfur compounds with a hot gas purge.

The composition of the fluid stream from which the primary bed became loaded with sulfur compounds is not a critical factor except that the sorbable sulfur compound concentration thereof should not be greater than about 0.25 wt. percent calculated as elemental sulfur. Most commonly, however, the sulfur compounds are on the bed as a result of being selectively adsorbed from a hydrocarbon stream, particularly hydrocarbon fractions boiling in the gasoline range such as natural gas condensate, straight run fractions from crude oil, or similar fractions from destructive hydrogenation or distillation of coal. When the regeneration procedure of the present invention is employed in conjunction with a hydrocarbon sweetening process, it is advantageous that the hydrocarbon stream being treated have a low content of olefinic and acetylenic unsaturates, preferably less than 1 wt. percent. The disadvantage of higher concentrations of these unsaturates is that they are adsorbed by the molecular sieve to about the same degree as the sulfur compounds. Accordingly, they ultimately are retained on the adsorbent in the secondary desulfurizer (bed) until the hot gas purge is employed and thereupon they polymerize and coke the bed causing a loss of adsorption capacity.

Similarly the particular molecular sieve zeolite employed as the adsorbent is not a critical factor but such zeolite should have a pore diameter large enough to adsorb the largest sulfur compound impurity which is present in a significant amount. Also, since the sulfur compound loading from one adsorption bed is in the course of operation of the process transferred to another adsorption bed, the adsorption selectivity of the zeolites in both beds should be at least approximately the same. For most of the common sulfur compound impurities, i.e., $H_2S$, COS and the lower normal alkyl mercaptans, zeolitic molecular sieves having pore diameters of about 5 Angstroms or greater are suitable adsorbents. It is preferred, however, that the molecular sieve employed is one of the so-called large pore species, i.e., one that can adsorb molecules as large as benzene in significant amount. Large pore zeolites include zeolite X, defined in U.S. Pat. No. 2,882,244, zeolite L defined in U.S. Pat. No. 3,216,789, zeolite Y as defined in U.S. Pat. No. 3,130,007, faujasite and some synthetically prepared or acid extracted mordenite. Zeolite X, in which the metal cations are one or more of Na, K, Ca, Mg and Sr, is particularly preferred. Small pore zeolites having pore sizes larger than 5 Angstroms include the calcium cation form of zeolite A as defined in U.S. Pat. No. 2,882,243 and natural and synthetic mordenite. In the cases where $H_2S$ is the sole significant sulfur compound impurity present, any zeolitic molecular sieve having a pore diameter larger than about 3 Angstroms is suitable. This includes essentially all of the synthetically prepared molecular sieve zeolites, some of which are defined in U.S. Pat. Nos. 2,950,952; 2,972,516; 2,995,423; 2,996,358;

3,011,869; 3,012,853; and 3,054,657. Naturally occurring zeolitic molecular sieves having pores larger than 3 Angstroms include phillipsite, erionite, analcime, gmelinite, chabazite and clinoptilolite.

The readily condensible paraffinic desorbent used to desorb the sulfur compound adsorbate from the primary desulfurizer (bed) can be any one or a mixture of two or more of $C_3 - C_6$ normal or iso paraffins and include propane, isobutane, butane, n-pentane, neopentane and methyl butane.

The purge material used to desorb the sulfur compounds from the secondary desulfurizer can be any thermally stable, non-sorbable or relatively non-sorbable on zeolitic molecular sieve normally gaseous composition which is substantially non-reactive with the molecular sieve and/or the sulfur compounds adsorbed thereon. In petroleum refineries where catalytic cracking of petroleum feed stocks is carried out there may be a limited supply of $H_2$ and $CH_4$ resulting from the cracking process. These materials separately or in admixture are excellent purge gases for use in the secondary desulfurizer in the present process and are preferred. This process can be operated at a location off refinery limits, using natural gas where the consumption of impurity-containing refinery gas as fuel is limited. Other suitable purge gases include nitrogen and $CO_2$.

The process is illustrated advantageously by reference to the drawing which is a schematic flow diagram of a full range natural gas condensate sweetening process. In the drawing the primary adsorption stroke consists of passing a full range natural gas condensate feed stream containing 500 ppm (wt.) $H_2S$ through line 10 and valve 12 into the bottom of primary adsorber 14 at the rate of 200 gallons/minute. The bed 14 contains approximately 25,000 pounds of sodium zeolite X pellets. Purified, i.e., $H_2S$-free, natural gas condensate is removed from the top of bed 14 through valve 16 and line 18 for the duration of the adsorption stroke which is about 12 hours. At the end of this period the bed contains approximately 400 pounds adsorbed $H_2S$. The bed 14 is then drained to remove interstitially held liquid hydrocarbon which is added to the feed stock, and with valves 16 and 12 closed 165,000 pounds of propane desorbent in the vapor phase at 550° F. is passed countercurrently through bed 14 entering line 20 and valve 22 and exiting through valve 24 and line 26. The desorption effluent consisting essentially of $H_2S$, propane and some feed stock hydrocarbons, is passed through line 26 to condenser 28 which cools the vapor phase propane to a temperature below 100°F. Under the pressure in the system, 200 psi the propane condenses and dissolves the desorbate containing $H_2S$. In the liquid phase, the $H_2S$-containing propane solution is then passed to liquid phase accumulator 32 through line 30 where the propane desorbent and $H_2S$ desorbate are blended before being further processed. From the liquid phase accumulator, the liquid propane solution is pumped by pump 34 through line 36 containing valve 38 into the bottom of secondary desulfurizer bed 40 at the rate of about 460 pounds/minute. The bed 40 contains 10,000 pounds of sodium zeolite X pellets and is at a temperature of 80° F. For the duration of the secondary adsorption stroke, about 6 hours, purified propane is removed from the top of the bed through line 42 and reserved for reuse to desorb primary bed 14 or otherwise utilized. In the desorption of primary bed 14, the propane desorbent will ordinarily become mixed with feed stock hold-up. Thus, if the propane is to be recycled to the primary desulfurizer, periodic fractionation will be required to prevent undue dilution thereof with higher hydrocarbons. The interstitially held impurity-laden propane is drained from the bed and either returned to the liquid accumulator 32, or otherwise disposed of. The $H_2S$ now adsorbed on the smaller secondary bed 40 is desorbed by purging with about 2,000 pound moles of natural gas at a temperature of 550° F. The purge gas enters the bed through line 48 and valve 50 and the desorption effluent is passed through line 44 for disposal. Due to the fact that the sulfur compounds have been concentrated by the present process, one feasible means of disposal thereof is conversion to elemental sulfur. Such a procedure avoids the need for eventual emission of sulfurous pollutants into the atmosphere.

The liquid phase accumulator for the desorption effluent from the primary desulfurizer is essential to the present process. During the desorption stroke, the molecular sieve receives heat at the expense of the sensible heat of the incoming desorbent. A thermal front moves through the bed. In the hot zone behind the heat front impurities are desorbed from the molecular sieve and transferred into the flowing desorbent. Since the desorbent flows at a linear velocity exceeding that of the heat front, the impurity-laden desorbent necessarily passes through the heat front into the cooler portion of the bed where the described impurities can be selectively re-adsorbed; this sequential desorption and readsorption of sorbates causes the impurities to be eluted from the bed in concentration peaks.

The sulfur compounds adsorbed from a hydrocarbon carrier such as a natural gas condensate stream appear in concentration peaks in the desorbent. The fluctuating impurity concentration in the desorbent impedes efficient purification of that gas stream. In an adsorption process, the adsorbate zones in equilibrium with higher impurity concentrations generally move more rapidly through a molecular sieve bed than those in equilibrium with lower impurity levels, because of the typical shape of adsorption isotherms. Thus, an adsorption system for repurifying the aforementioned desorbent would require a greater amount of adsorbent than a similar system designed to purify the same stream at the lower, averaged concentration levels. Accumulation of the sulfur-laden desorbent medium in the liquid phase is employed to minimize fluctuations of the impurity levels in the stream. The use of a condensible desorbent medium and the accumulation of the spend desorbent in the liquid phase prior to purification represent a significant departure from the prior art.

In order to illustrate the substantial decrease in purge gas requirements attainable by means of the process of this invention, identical purification adsorption strokes are carried out on identical adsorption beds. In one case, conventional hot purge regeneration is carried out, and in the other, the desorption process of this invention is utilized. The feedstock is natural gasoline containing $H_2S$ impurity and the feed rate is 200 gallons/minute. The natural gas purge is carried out at a temperature of 600° F. Butane is the low boiling paraffin used to purge the primary bed in the case of the present process. The comparison is shown in tabular form below:

| Process Description | Present Process | Conventional Process |
|---|---|---|
| Postulated Breakthrough Capacity (gal. of natural gasoline/lb. molecular sieve) | 5 | 5 |
| Adsorber Size, lbs. LMS/Bed | 30,000 | 30,000 |
| Number of Primary Adsorbers | 2 | 2 |
| Adsorption Time/Cycle Time, hrs/hrs | 12/24 | 12/24 |
| Number of Auxiliary Adsorbers | 1 | 0 |
| Size of Auxiliary Adsorber, lbs. molecular sieve/Bed | 12,000 | — |
| Net Average Regeneration Requirements Natural Gas, MSCFH | | |
| Fuel | 11 | 4 |
| Purge | 75 | 185 |
| Total | 86 | 189 |

Although the present process has been exemplified with a certain degree of particularity, it will be obvious to those skilled in the art that a variety of modifications can be made without departure from the proper scope of the invention. For example, the process can be used in conjunction with any fluid stream purification operation where the sulfur compounds are present in low concentrations and can be selectively adsorbed on molecular sieves. This process can be applied to desulfurizing stabilized natural gasoline or LPG fractions as well as natural gas.

With regard to the process step wherein the sulfur compound-laden desorbent from the primary desulfurizer is condensed and accumulated prior to purification, it is advantageous from the standpoint of efficient use of the secondary desulfurizer to accumulate the major proportion of the desorbed sulfur compounds in a relatively small proportion of desorbent and to isolate this product from the solution of the remaining sulfur compounds in the remaining desorbent. Thereafter in the secondary desulfurizer, the more dilute solution is treated first followed by the more concentrated solution. Such a process embodiment, however, requires additional piping, valves, monitoring apparatus and the like.

It will further be understood by those skilled in the art that the process can utilize a number of primary adsorbent beds in conjunction with one or more additional secondary desulfurizers in order to make the process continuous with respect to all sections of the system. All adsorption strokes can be downward or upward, vapor phase or liquid phase or any combination thereof in the manner conventional in the art.

What is claimed is:

1. Process for removing sulfur compound from a zeolitic molecular sieve bed which comprises providing a primary bed of molecular sieve adsorbent containing as an adsorbate thereon less than about 5 wt. percent based on the weight of anhydrous adsorbent and calculated as elemental sulfur of at least one or a mixture of two or more sulfur compounds of the group consisting of $H_2S$, COS, RSH, RSR and and RSSR, wherein R is an alkyl group having from one to five carbon atoms, desorbing and purging said adsorbate from the primary bed to the desired degree using a readily condensible paraffin desorbent having from three to six carbon atoms in the vapor phase and at a temperature of from 400° F. to 650° F., condensing and accumulating the desorbent containing the sulfur compound desorbate to form a solution containing at least 50 wt. percent of the total sulfur compound desorbate and at least 30 wt. percent of the total desorbent used to purge the sulfur compounds from the primary bed, thereafter passing said accumulated solution in the liquid phase through a smaller secondary molecular sieve adsorption bed wherein the sulfur compounds are selectively adsorbed on the molecular sieve adsorbent, and thereafter desorbing the sulfur compounds with a hot gas purge.

2. Process according to claim 1 wherein the sulfur compounds initially present on the primary bed are present as a result of having been selectively adsorbed from a full range natural gasoline feedstock.

3. Process according to claim 2 wherein the normally gaseous readily condensible paraffin desorbent comprises propane and the molecular sieve adsorbent in both the primary and secondary adsorbent beds is zeolite X.

* * * * *